July 18, 1950
J. T. BARRETT
EXPANSIBLE CHAMBER ROTARY MOTOR OF
THE SLIDING ABUTMENT TYPE
2,515,288
Filed Nov. 15, 1944
2 Sheets-Sheet 1
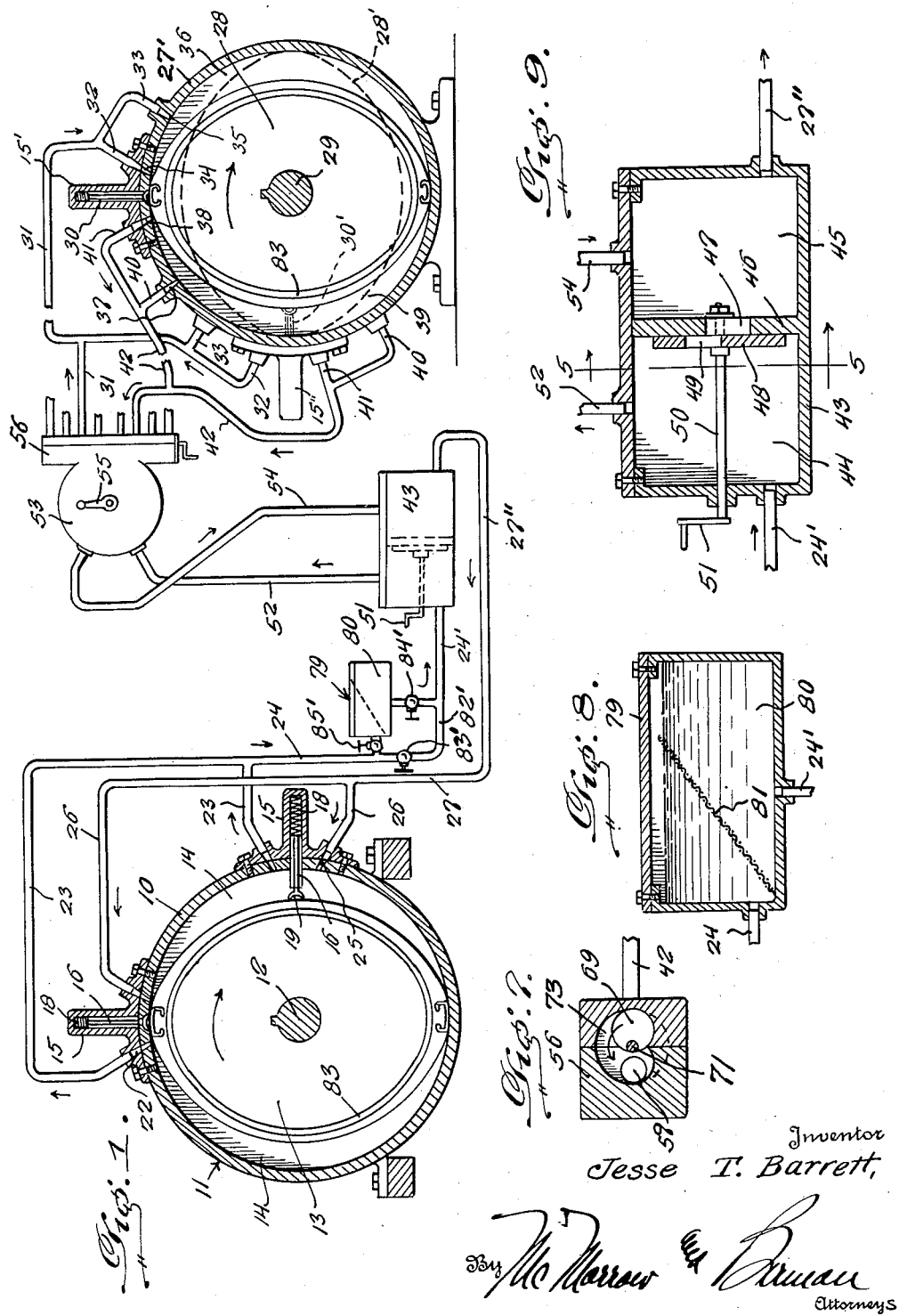
Inventor
Jesse T. Barrett,
By McMorrow & Berman
Attorneys

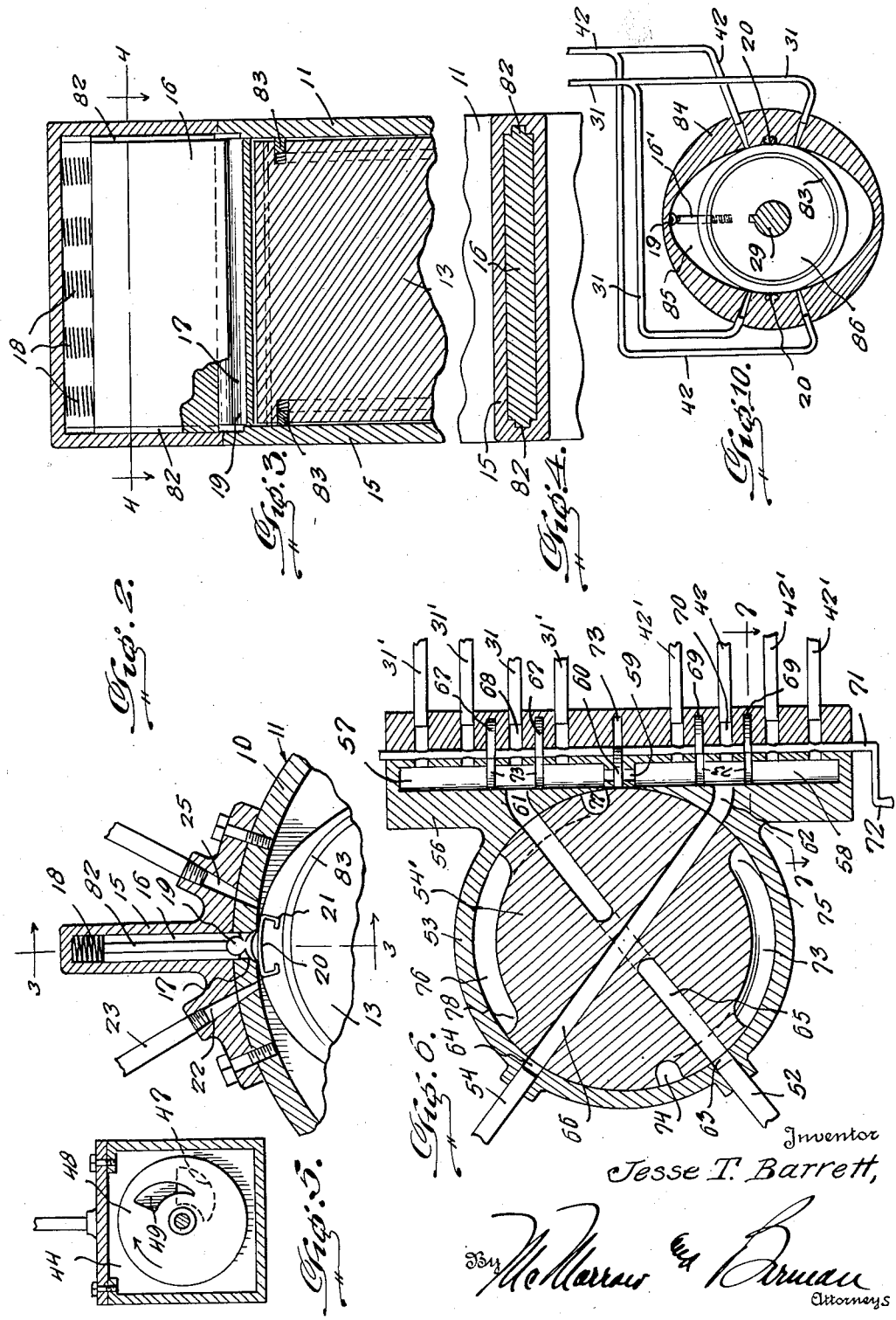

Patented July 18, 1950

2,515,288

UNITED STATES PATENT OFFICE 2,515,288

EXPANSIBLE CHAMBER ROTARY MOTOR OF THE SLIDING ABUTMENT TYPE

Jesse T. Barrett, Eudora, Ark.

Application November 15, 1944, Serial No. 563,590

2 Claims. (Cl. 121—77)

This invention relates to fluid pressure power generation and transmission means, an object being to improve generally upon means of this kind so as to minimize loss of energy and attain a high order of efficiency in operation and control of the correlated and interdependent cooperative working parts. An important object is to improve in particular the transmission means as to the working parts thereof and the system of association thereof in a practical assembly capable of substantial flexibility in various installations whether the prime mover or driving element and the driven element or elements are connected in relatively close relation to each other or at considerable distance apart. A further object is to provide for varying the speed and pressure of the prime mover and in the control and regulation of the transmission means with provision for varying the speed and power of the driven element.

Other objects and advantages to be attained will hereinafter more fully appear in the following detailed description of the invention.

A practical but non-limiting adaptation of the invention is illustrated in the accompanying drawings showing both structurally and schematically prime mover or power elements and driven elements having rotors of an elliptical type and said elements being connected by a transmission means in accordance with the present invention, in which drawings:

Figure 1 is a view partly in section and partly in side elevation of a complete operative assembly;

Figure 2 is a fragmentary view, in section, illustrating details of the prime mover or power element;

Figure 3 is a fragmentary section taken on or about the line 3—3 of Figure 2;

Figure 4 is a section on the line 4—4 of Figure 3;

Figure 5 is a section on the line 5—5 of Figure 9 showing details of the controlling valve in the flow control box of the pressure fluid medium;

Figure 6 is a fragmentary sectional view, on an enlarged scale, showing details of the valve means for controlling and varying the directional flow of the fluid pressure in the transmission means;

Figure 7 is a sectional view on the line 7—7 of Figure 6;

Figure 8 is a sectional view illustrating structural details of the air eliminating element of the transmission means;

Figure 9 is a longitudinal section through the controlling box and valve element of the transmission means which regulates the volume of fluid passing from the prime mover or power element to the driven element; and Figure 10 is a detail view of a modified form of driven element.

Referring now to the drawings in detail, the numeral 10 designates the cylindrical housing or casing of the prime mover or power generating element 11 of the invention. This element is in the nature of a pump comprising a shaft 12 which is driven from a conventional motor (not shown). Keyed fixedly on the shaft 12 to rotate by and therewith is an elliptical rotor 13, the ends of the longer axis of which ride in close relation to the inner peripheral face of the housing or casing 10. The rest of the circumferential face of the rotor 13 is out of contact and spaced away from the opposed face of the housing or casing 10, whereby to define fluid chambers 14 in the housing or casing 10. The widest portion of the chambers 14 is at opposed distances coincident with the shortest axis of the elliptical rotor.

Slidable in hollow rectangular extensions 15 of the housing or casing 10 are gate members or abutments 16 which are urged through openings 17 in the peripheral wall of the housing or casing 10 and into the respective chambers 14. The means for urging the gate members 16, as shown more clearly in Figures 2 and 3, comprises a plurality of spring elements 18. As shown at 19 and more clearly in Figures 2 and 3, the gate element 16 has a contact shoe pivotally attached to its inner end for engaging the circumferential face of the elliptical rotor 13. As shown, this contact element 19 is arcuate in form on its outer face, thus providing opposite margins which engage edgewise with the face of the rotor.

The pivotal mounting of the contact member 19 and retention of the same in the gate valve 16 is by the formation of the base of the member 19 as a bead of substantially cylindrical cross section and the fitting of this beaded portion in a counterpart undercut groove formed therefor in the adjacent edge portion of the gate valve. The peculiar form of the contact member 19 is such that the opposite edge portions of the member are held in contact with the periphery of the rotor 13 and effective seal is provided which prevents passage of fluid between the member 19 and rotor 13 to and from either side of the gate valve 16. An effective seal is also provided between the diametrically opposite apex portions of the rotor 13 coinciding with the longest axis of the rotor, by the provision of resilient sealing elements 20 which are arched transversely so as to be crowned and projected normally a slight distance beyond the peripheral face of the rotor so that, when the rotor is placed in the housing or casing 10, the resilient member 20 is sprung back toward the rotor surface and placed under tension so as to constantly react into pressing contact with the inner face of the peripheral wall of the housing or casing 10. As shown more clearly in Figure 2, the opposite side margins of the resilient member 20 are rebent, as at 21, and fitted into undercut key grooves in the adjacent peripheral portion of the rotor 13.

In the illustrated adaptation of the invention (see Figure 1) the prime mover or power element 11 is provided with two of the aforesaid gate valves. These valves are arranged at right angles to each other or at an angle of 90° from the axis of the rotor. Leading from ports 22 in the housing or casing 10, respectively at one side of the gate valves 16, are branch pipes 23 each connecting with a fluid supply pipe 24 of the transmission system to be later described more fully in detail. At the opposite side of each gate valve 16, the housing or casing 10 is provided with a port 25 and connected to these ports 25 are branch pipes 26, both connected to a return pipe 27 of the transmission system.

With the provision and arrangement of the parts of the prime mover or power generator as above described, if the rotor 13 is rotated clockwise as indicated by the arrow in Figure 1, and with the gate valves 16 pressing with their contact members 19 in engagement with the peripheral face of the rotor 13, the fluid within the chambers 14 in the housing or casing 10 is displaced and forced out through the branch pipes 23 into the conducting pipe 24 of the transmission system. This results from the gradual reduction in volume of the contained liquid which is crowded by the high and wall sealing portion of the rotor against one side of the abutment afforded by the inwardly pressed gate valve 16. In the chamber 14 at the opposite side of the gate valve 16 a partial vacuum is created during the rotation of the rotor 13 whereby fluid from the return conductor pipe 27 flows through the branch pipes 26 into the chamber 14 which is at this time gradually increasing in area and accordingly taking in an increased volume of the liquid.

As shown to the right in Figure 1, the driven element is also of the elliptical rotor type. In this illustrated adaptation of the invention, the housing or casing 27' of the driven element is of a generally cylindrical form. The rotor 28 of this driven element is substantially identical with the rotor 13 of the prime mover or power element 11. It is fixed on a driven shaft 29 journaled to rotate in any conventional manner in the housing or casing 27' and which is adapted to operate a utility or utilities (not shown).

A radial gate valve 30 is provided on the housing or casing 27' and arranged to operate in a manner similar to the gate valves 16 of the prime mover or power element 11. A fluid supply pipe 31 has a pair of branches 32, 33 spaced apart and communicating through ports 34 and 35 with a chamber 36 in the housing or casing 27' at one side of the gate valve 30. Attached communicably to ports 37 and 38 respectively opening into an evacuating chamber 39 is a pair of branch pipes 40, 41 of a return conductor pipe 42.

In practice, a pair of the driven rotors 28 and 28' are provided in cooperative relation to each other on the shaft 29. They may be in separate housings 27' or a single housing having separate chambers of substantially like form and arrangement as illustrated in the full lines in Figure 1 and with the two rotors 28 and 28' set in parallel position on the shaft 29, in which case, two radial extensions 15' and 15'' of the casing or housing containing the gate valves 30 and 30', respectively, are disposed at an angle of 90° to each other. This relative parallel arrangement of the two rotors on the shaft and right-angular positioning of the gate valves gives a balanced operating effect whereby the rotation of the shaft 29 is practically constant.

Instead of having the parallel arrangement of the rotors 28 and 28' on the shaft 29 the rotors may be set at right angles to each other, as shown in dotted lines in Figure 1, in which case, of course, the radial gate valves 30, 30' for both rotors will be in one common longitudinal position instead of being located at right angles, as shown in Figure 1.

In operating effect the two conductor pipes 24 and 31 are substantial continuations of each other. Likewise, the return pipes 27 and 42 are, in effect, continuations of each other. That is to say, the said pipes are substantial continuations of each other except for the interposition of correlated elements to be presently described and utilized as means for controlling and regulating the volume and direction of flow of the fluid between the driving element and the driven element of the apparatus.

The fluid conductor pipe 24, through the right-angular extension 24', leads directly into a fluid volume control box 43 (see Figures 1 and 9). At the end of the box 43 opposite to that where the pipe 24 is attached through said pipe 24', an extension 27'' of the return pipe 27 is connected. The box 43 has provision for controlling the flow of fluid therethrough whereby the fluid may be either passed directly from the pipe 24' to the pipe 27'', in which case the fluid displaced from the power unit 11 by rotation of the rotor 13 is returned directly to the unit, or else the fluid from the pipe 24' may be conducted at the will of the operator to the conductor pipe 52 and the pipe 31 leading to the driven element 27', from which element the fluid displaced therein is returned through the pipe 42 and the pipe 54 to said control box 43. The device 43 not only controls the direction of fluid flow as just above described but is also provided and arranged to control the volume of fluid passed through the box and either to the driven element 27' or returned to the driving element 11. For the accomplishment of this the box is divided into two separate chambers 44, 45, by a partition 46 located substantially midway between the ends of the box. The partition 46 is provided with an opening of maximum area 47, which as shown, has two of its sides curved. A rotatable disc or gate valve 48 is located close to and in sliding facial contact with one side of the partition 46 and provided with an opening of an elongated and substantially arcuate form and with convergent sides so as to vary in width from one end of the opening to the other, the disc 48 being mounted on a shaft 50 having a crank 51 on its outer end whereby it may be operated from without the box 43. By rotating the disc 48, the opening 47 in the partition 46 may be closed entirely or opened to any proportionate degree desired. When the disc 48 is turned to uncover the opening 47 in the partition 46 to the maximum area thereof, and the area of the opening being then considerably in excess of the capacity of the pipes 24' and 27'', the volume of flowing liquid is at its maximum and the travel is directly from the pipe 24', through the partition opening 47 to pipe 27''. In this particular control of the fluid there is no appreciable effect of the fluid on the driven element 27'. However, if the opening in the partition 46 is appreciably reduced in area by the turning of the disc valve 48, thus restricting the flow of the fluid through the opening 47, fluid under the pressure built up in the chamber 44 is conducted from the box 43 through a pipe 52 to a directional flow controlling element 53 to be presently described more fully in detail, and from this element 53 into the conductor pipe 31 leading to the driven element 27'. Fluid evacuated from the driven element 27' is conducted through the pipe 42 to the directional flow controlling element 53, thence back to the flow control box 43 through a return pipe 54. The return pipe 54 leads into the chamber 45 of the control box 43 and from this chamber 45 the fluid is conducted through the branch pipe 27'' and return conductor pipe 27 to the driving element 11. It will thus be seen that the fluid from the pipe 24' may be conducted directly to the driven element 27' through the medium of the interposed control element 53 and at such varying lesser degrees of pressure obtained by adjusting the valve member 48 to vary the effective working area of the opening 47 in the partition 46.

The directional flow controlling element 53 shown generally in Figure 1 is illustrated more clearly in detail in Figures 6 and 7. The body housing or casing of this element has a generally cylindrical body portion in which is fitted a rotatable disc valve 54' that is operated by a crank 55 located outside of the body housing or casing. The body housing or casing of the element 53 has a transverse extension 56 in which two longitudinally aligned elongated chambers 57 and 58 are formed, said chambers being intercommunicable at their meeting ends through a passageway 59. This passageway 59 is normally closed by a valve element 60. The chambers 57 and 58 have port openings 61 and 62, respectively, which are disposed diagonally with relation to port openings 63 and 64 in the cylindrical body portion of the element 53, the port opening 63 being provided for the attachment of the conductor pipe 52 and the port opening 64 being provided for the attachment of the fluid return pipe 54. The rotary valve element 54' is provided with a diametrical passageway 65 establishing communication between the ports 61 and 63 in the normal position of the valve member. A diagonally arranged passageway 66 in the valve member establishes communication between the ports 62 and 64 at the time communication is established between the ports 61 and 63 through the said passageway 65, it being understood that the two passageways 65 and 66 are dipped or deflected out of alignment so as to cross at the center of the valve member 54' without interference with each other.

The fluid chamber 57 of the controlling element 53 may be provided to supply fluid to a single conductor pipe 31 for the transmission of power to a single driven unit. However, as illustrated in Figure 6, the chamber 57 functions as a manifold whereby the fluid may be supplied simultaneously to a plurality of additional conductor pipes 31' leading to a corresponding number of separate driven units. The other chamber 58 may be likewise used to receive fluid from a single return pipe 42, from a single driven unit or from a plurality of return pipes 42' delivering fluid from a corresponding number of driven units to said chamber 58. In the illustration in Figure 6, the valve 60 is shown in closing relation to the passageway 59 between the two chambers 57 and 58. So, too, at this time, the fluid supply chamber 57 is open to all of the several pipes 31, 31'. The opposite chamber 58 is also in communication with all of the pipes 42, 42'. However, a pair of spaced apart valve members 67 are provided to straddle the port openings 61 and an opposed port opening 68 where the conductor pipe 31 communicates with the chamber 57. Corresponding valves 69 are provided for limiting communication solely between the port 62 and an opposed port 70 through which the return pipe 42 communicates with the chamber 58. All of the valves 60, 67 and 69, are mounted upon a common operating shaft 71 having a manipulating handle 72 at the front end thereof. Similar pockets 73 are provided for each of the said valve members to accommodate them in their opened and closed positions and the valve members are simultaneously operated by turning the shaft 71. In this way, when the valve member 60 is in closed relation to the passageway 59 the other valves 67 and 69 are in their opened position with relation to the pipes 31 and 42, respectively. At this time, as above stated, communication is established between the chamber 57 and all of the pipes 31, 31' and likewise between the chamber 58 and the pipes 42, 42', to operate several driven units either in series or parallel.

In the position of the valve 54' as shown in Figure 6, the fluid under pressure from the power unit 11 is delivered to the driven unit 27' so that the rotor or rotors 28 thereof are caused to rotate in a clockwise direction as indicated by the arrow in Figure 1. To reverse the operation of the driven unit 27' the valve member 54' of the controlling element 53 is provided with an annular circumferential passageway 73 that, by rotation of the valve member 54' one end portion 74 of the passageway 73 is brought into communicable registration with the supply pipe 52, and at the same time the opposite end 75 of this passageway 73 is brought into communicable registration with the port 62, whereby the fluid under pressure from the power element 11 is delivered into the chamber 58 instead of the chamber 57. The valve member 54' is provided with an opposite circumferential passageway 76, one end 77 of which is brought into communicable registration with the port 61 and its opposite end portion 78 in communicable registration with the return pipe 54. The driven unit will thus be driven reversely to the direction indicated in Figure 1. It is here also noted that if either one of the passageways 73 or 76 of the valve member 54' are, by the turning of the valve member 54', brought into a position to establish communication directly between the conductor pipe 52 and return pipe 54, no fluid is passed to either of the chambers 57 or 58 but is returned directly to the power element 11. The power element 11 thus idles in its operation without any driving effect at all upon the driven unit 27'. At this time, the pressure of the fluid in the housing 27' of the driven unit is equalized in the chambers on opposite sides of the rotor 28 and has a braking effect on the rotor.

An air eliminator may be provided at any convenient point or points in the transmission system. An example of such provision is illustrated in Figures 1 and 8. As shown in Figure 1, the air eliminator, indicated generally by the numeral 79, is located in the line between the conductor pipe 24 and its branch 24' which enters the fluid volume control element 43. As shown more clearly in the sectional view in Figure 8, the air eliminator device 79 comprises a box 80 at one end and near the bottom of which the pipe 24 enters, while the branch pipe 24' leads out of the bottom of the box. Extending diagonally from the end and bottom of the box 80 where the pipe 24 enters and terminating near the top of the box so as to overhang the port opening where the pipe 24' enters the box, is a screen member of comparatively fine mesh 81. In the operation of the transmission means of the present invention, fluid in the box builds up to a considerable level but not above the top of the screen 81. Fluid entering the box from the pipe 24 has to pass through the screen 81 from side of side thereof before passing from the box through the branch pipe 24'. Thus any air bubbles in the fluid entering the box 80 are interrupted by the screen and rise to the surface of the body of fluid and into the space maintained thereabove and having the effect of breaking up the bubbles with the result that the liquid that has passed through the screen 81 is free of any air which would have a detrimental effect and take from the desired non-compressibility of the fluid.

It is here noted that by reference more particularly to Figures 2, 3 and 4, the gate valve member 16 is rabbeted at each end to provide a rib 82 which works with a close sliding fit in a counterpart groove in the adjacent end wall of the valve casing extension 15 of the power element 11 or driven element 27', as the case may be. This is to afford an efficient guiding means for the valve member 16 and at the same time prevent leakage of the fluid from the elements 11 and 27'. So, too, by reference to Figures 1, 2 and 3, it is seen that the rotors 13 and 28 are provided on their opposite side faces with packing elements 83 substantially paralleling the elliptical curvature of the rotors. These packing elements 83 bear against the adjacent side walls of the housings or casings 11 and 27' and afford effective seals against leakage of fluid between the rotors and casing walls.

In Figure 10 there is illustrated a modification of the driven unit 27'. In this form of the unit the stationary housing or casing 84 has an elliptical chamber 85, and the rotor 86 working therein is truly circular. There is a further difference in that the radial sliding gate valve 16' is carried by the rotor instead of the housing or casing as in the first herein described form of unit 27'. So, too, the resilient fluid-sealing elements 20 are mounted on diametrically opposite inner face portions of the elliptical chamber 85 across the shortest axis of the ellipse. In the use of this modified form of driven unit there will be associated in cooperative relation a pair of the housings or casings 84 with the respective elliptical chambers thereof arranged with their longest axes at right angles to each other so as to have substantially the same operating effect as in the instance of the arrangement of elliptical rotors 28 and 28' in Figure 1.

In the general adaptation and use of the transmission means of the present invention, an air eliminating element of the character described will be located at the place indicated in the illustration in Figure 1, and, in some cases, at other places in the pipe line, depending upon the length of the line in the particular installation, but should it be desired to shunt or bypass the flow of the fluid outside of the box 80, the conducting pipes 24 and 24' may be connected by a bypass pipe 82' (see Figure 1) having a cutoff valve 83' which is opened for use of the bypass 82' when desired, but closed when it is desired to pass the liquid through the air eliminating element 79. When the valve 83' is opened the fluid will pass from the pipe 24 through the bypass 82' to the pipe 24' by way of least resistance but, if desired, a similar cutoff valve 84' may be provided in the pipe 24' just where it leaves the box 80, and still another valve 85' may be provided in the end portion of the pipe 24 just where it enters the box 80. By closing either or both of the valves 84' and 85' it is assured that no fluid will travel from the pipe 24 through the box and into the pipe 24'.

By the disclosure in the drawings and the foregoing description thereof it is clearly apparent that a fluid power generation and transmission system is produced which is adaptable for practical use in closely arranged and self-contained fluid power generators and transmission of the same to a driven element such as, for example, in a motor vehicle or the like, and in various installations where the driven element or unit is located at a considerable distance remote from the power unit or driving element, thereby eliminating the necessity for using complicated and expensive mechanical transmission elements.

The illustrated construction and arrangement of parts is for the purposes of exemplification of the invention without limitation to any one particular construction and arrangement. The invention, therefore, may be embodied in many different adaptations thereof within the spirit and scope of the appended claims and is not limited to the specific construction and arrangement shown. That is to say, for example, all of the controlling elements in the transmission system between the fluid power generator and the driven unit may be eliminated, except possibly a fluid volume control element of the character of the hereinabove described device 43 to provide for variable speed operation of the rotor of the driven unit and to afford a braking effect by bringing to the stopping point any rotation of the rotor. So, too, by providing by-pass connections between an extraneous utility to be supplied with fluid pressure and the supply pipe 23 from and the return pipe 26 to the power generator 11, the power generator may be obviously used as a force or booster pump.

Having thus described the invention, what I claim is:

1. In a rotary fluid pressure-operated means comprising a casing having paired chambers with aligned bearings, a driven shaft rotatably mounted in the bearings, a pair of rotors fixed upon the shaft and individually disposed in the two casing chambers, a pair of radial extensions upon the casing, a pair of radial gate valves movably disposed in said radial extensions operative individually inwardly against the rotors in said two casing chambers, the casing having in connection with both chambers both inlet and outlet ports for pressure fluid spaced fore and aft of the radial gate valves, the features which include having the rotors elliptical in form to provide two diametrically opposite maximum radial extensions upon each rotor dividing each chamber in the casing into two pressure chambers upon the opposite sides of each rotor, and having the two radial gate valves with their associated inlet and outlet ports and the two elliptical rotors mutually disposed in such angular relation that when one maximum radial extension of one rotor passes the radial gate valve operating against the latter, the other rotor presents the intermediate portion of one of the sides thereof to the other gate valve with the latter angularly disposed at 90° to the maximum radial extensions of said other rotor in order to provide a new driving impulse to said driven shaft at each quarter revolution thereof.

2. In a rotary fluid-pressure-operated means comprising a casing having paired chambers with aligned bearings, a driven shaft rotatably mounted in the bearings, a pair of rotors fixed upon the shaft and individually disposed in the two casing chambers, a pair of radial extensions upon the casing, a pair of radial gate valves movably disposed in said radial extensions operative individually inwardly against the rotors in said two casing chambers, the casing having in connection with both chambers both inlet and outlet ports for pressure fluid spaced fore and aft of the radial gate valves, the features which include having the rotors elliptical in form and co-extensively mounted on the driven shaft to provide two diametrically-opposite maximum radial extensions upon each rotor dividing each chamber in the casing into two pressure chambers upon the opposite sides of each rotor, and having a radial gate valve with the inlet and outlet ports associated therewith and operating against one rotor angularly disposed substantially at 90° with respect to the other gate valve with the inlet and outlet ports associated therewith and operating against the other rotor in order to provide a new driving impulse to said driven shaft at each quarter revolution thereof.

JESSE T. BARRETT.

REFERENCES CITED

The following references are of record in the file of this patent:

UNITED STATES PATENTS

| Number | Name | Date |
| --- | --- | --- |
| 23,852 | Miller | May 3, 1859 |
| 383,530 | Jarvis | May 29, 1888 |
| 549,390 | Patterson et al. | Nov. 5, 1895 |
| 595,536 | Fassett | Dec. 14, 1897 |
| 610,497 | Probst | Sept. 6, 1898 |
| 690,379 | Sunderland | Dec. 31, 1901 |
| 1,049,615 | Sleigh | Jan. 7, 1913 |
| 1,056,606 | Vaughan et al. | Mar. 18, 1913 |
| 1,099,161 | Brown | June 9, 1914 |
| 1,156,818 | Rich | Oct. 12, 1915 |
| 1,164,105 | Lentz | Dec. 14, 1915 |
| 1,190,139 | Ford | July 4, 1916 |
| 1,257,776 | Allan | Feb. 26, 1918 |
| 1,346,086 | Funk | July 6, 1920 |
| 1,349,924 | Swanson | Aug. 17, 1920 |
| 1,354,777 | Rock | Oct. 5, 1920 |
| 1,578,758 | Reed | Mar. 30, 1926 |
| 1,840,869 | Rayburn | Jan. 12, 1932 |
| 1,887,918 | Brouse | Nov. 15, 1932 |
| 1,935,544 | DeLancey | Nov. 14, 1933 |
| 2,056,910 | Schauer | Oct. 6, 1936 |
| 2,145,304 | Hill | Jan. 31, 1939 |
| 2,221,308 | Dischert | Nov. 12, 1940 |
| 2,221,462 | Trambly | Nov. 12, 1940 |
| 2,242,807 | Austin | May 20, 1941 |
| 2,276,895 | Vosseler et al. | Mar. 17, 1942 |
| 2,370,526 | Doran | Feb. 27, 1945 |